United States Patent [19]

Brokans

[11] Patent Number: 4,871,560
[45] Date of Patent: Oct. 3, 1989

[54] METHOD OF COMBINING FISH SAWDUST WITH FLAKED FISH

[76] Inventor: Alexander Brokans, Quail Run Rd., Rte. 3, Box 123-12, Denton, Md. 21629

[21] Appl. No.: 140,103

[22] Filed: Dec. 31, 1987

[51] Int. Cl.⁴ .............................................. A23L 1/325
[52] U.S. Cl. .................................. 426/272; 426/273; 426/274; 426/289; 426/643
[58] Field of Search ............... 426/272, 273, 274, 289, 426/643

[56] References Cited

U.S. PATENT DOCUMENTS

| | | | |
|---|---|---|---|
| 2,555,232 | 5/1951 | Guice | 426/272 |
| 3,432,311 | 3/1969 | Gruner | 426/272 |
| 3,712,821 | 1/1973 | Ronsivalli | 426/274 |
| 3,857,986 | 12/1974 | Svendsen | 426/274 |
| 4,518,620 | 5/1985 | Monagle et al. | 426/289 |
| 4,714,618 | 12/1987 | Matsuda | 426/524 |

Primary Examiner—Donald E. Czaja
Assistant Examiner—Helen Pratt
Attorney, Agent, or Firm—Sanford J. Piltch

[57] ABSTRACT

The invention comprises a process for manufacturing certain foodstuffs, particularly fish meat patties and/or nuggets, from the waste cuttings from frozen whole fish fillets without the use of binders, moisturizers, preservatives or other adulterating agents or the use of denaturing processes. The process produces a formed fish meat patty, nugget or other desired formed shape which is breaded and partially cooked. The formed fish meat patty or nugget is then frozen and stored for later reheating prior to being served.

5 Claims, 1 Drawing Sheet

METHOD OF COMBINING FISH SAWDUST WITH FLAKED FISH

BACKGROUND OF THE INVENTION

The method of this invention resides in the field of process manufacturing of foodstuffs and, more particularly, in the area of process manufacturing of fish meat.

The manufacturing process of making fish meat into patties or nuggets has been known for many years. The final product, a patty or a nugget, was actually formed flaked fish meat. The making of the product was begun with trimmings of fillets of whole fish and minced fish frozen into large blocks. The frozen blocked trimmings and minced fish meat were then cut into smaller pieces for placement into a chopper or shaver for creating small flakes or granules of fish meat. The fish meat, in its flaked or granular state, was combined with potato flakes and milled wheat granules to bind the flaked or granular particles of fish meat together. Vegetable oil (or a substitute) and seasonings were added and the entire combination was mechanically mixed together for less than a minute. The resulting fish meat paste was put through a forming machine, either mechanically or hydraulically driven and fed, for compacting the fish meat paste into formed patties or nuggets. The formed patty or nugget was then breaded, pre-fried, packaged and cold-stored.

This process required the use of binders to cause the granular sized particles of fish meat to stick together in order that the vegetable oil, seasonings and flavorings could be added and uniformly distributed throughout the fish meat combination by mechanical mixing. The drawback to this method was that the fish meat combination would not stick together without the binding agents. The various acceptable binding agents caused a disparity in the uniform consistency of the resulting product, differences in taste and visual acceptability of the product, and required preservatives for a reasonable shelf-life. With the exception of the process of the present invention, this manufacturing process of fish meat patties and/or nuggets is still in use today.

It is, therefore, an object of the present invention to achieve uniform granular consistency of the resulting fish meat product by using a binding technique utilizing a naturally occurring fish meat protein without having to resort to synthetic or additive binders.

It is another object of the present invention to achieve a process for manufacturing fish meat products using fish meat waste from the filleting or cutting of whole fish.

It is still another object of the present invention to achieve a process for manufacturing fish meat products without need for fillers, synthetic chemical binders and/or preservatives and, thus, keep the nutritional value of the foodstuff high.

It is yet another object of the present invention to achieve a process for manufacturing fish meat products taking advantage of and using naturally occurring proteins in fish meat to obviate the need to add synthetic binders, preservatives, moisturizers, and other adulterating and denaturing products which adversely affect the flavor, taste, and visual acceptability of the fish meat product.

Other objects will appear hereinafter.

SUMMARY OF THE INVENTION

The invention comprises a process for manufacturing certain foodstuffs, particularly fish meat patties and/or nuggets, from the waste cuttings from frozen whole fish fillets without the use of binders, moisturizers, preservatives or other adulterating agents or the use of denaturing processes. The process produces a formed fish meat patty, nugget or other desired formed shape which is breaded and partially cooked. The formed fish meat patty or nugget is then frozen and stored for later reheating prior to being served.

The process comprises the steps of combining waste cuttings and/or trimmings of whole fish fillet in the form of a frozen block fish meat sawdust which have been flaked, shaved, or ground into granular particles with a means for initiating and enhancing the formation of fibrous protein gells to bind together the fish meat sawdust mixture; mixing or stirring the fish meat sawdust mixture at a predetermined temperature and pressure until the protein gells form and the fish meat sawdust mixture becomes tacky or pasty and combining the tacky or pasty fish meat sawdust mixture with frozen fillets of whole fish which have been flaked, shaved, or ground into granular particles to bind together the entire fish meat combination; mixing or stirring the fish meat combination at a predetermined temperature and pressure until the entire fish meat combination is uniformly mixed together; molding or forming the fish meat combination into a predetermined shape or shapes; applying a covering of batter and breading to the formed fish meat combination, pre-cooking the breaded formed fish meat combination and, flash freezing the pre-cooked breaded fish meat combination.

Equal proportions of fish meat sawdust and fillet are combined to achieve the desired binding characteristics for the entire fish meat combination. The desired predetermined process temperature is in the range of 30°-35° F. The desired predetermined process pressure is approximately 20 psi.

The process also comprises the further step of packaging the fish meat combination with materials useful for reheating predetermined portions or in bulk for cold storage and/or transport. The process can accommodate a number of predetermined shape or shapes of the fish meat combination which may be in the form of a patty or a nugget.

BRIEF DESCRIPTION OF THE DRAWING

For the purpose of illustrating the invention, there is shown in the drawing forms which are presently preferred; it being understood, however, that the invention is not limited to the precise arrangement and instrumentalities shown.

DETAILED DESCRIPTION OF THE INVENTION

Figure 1:
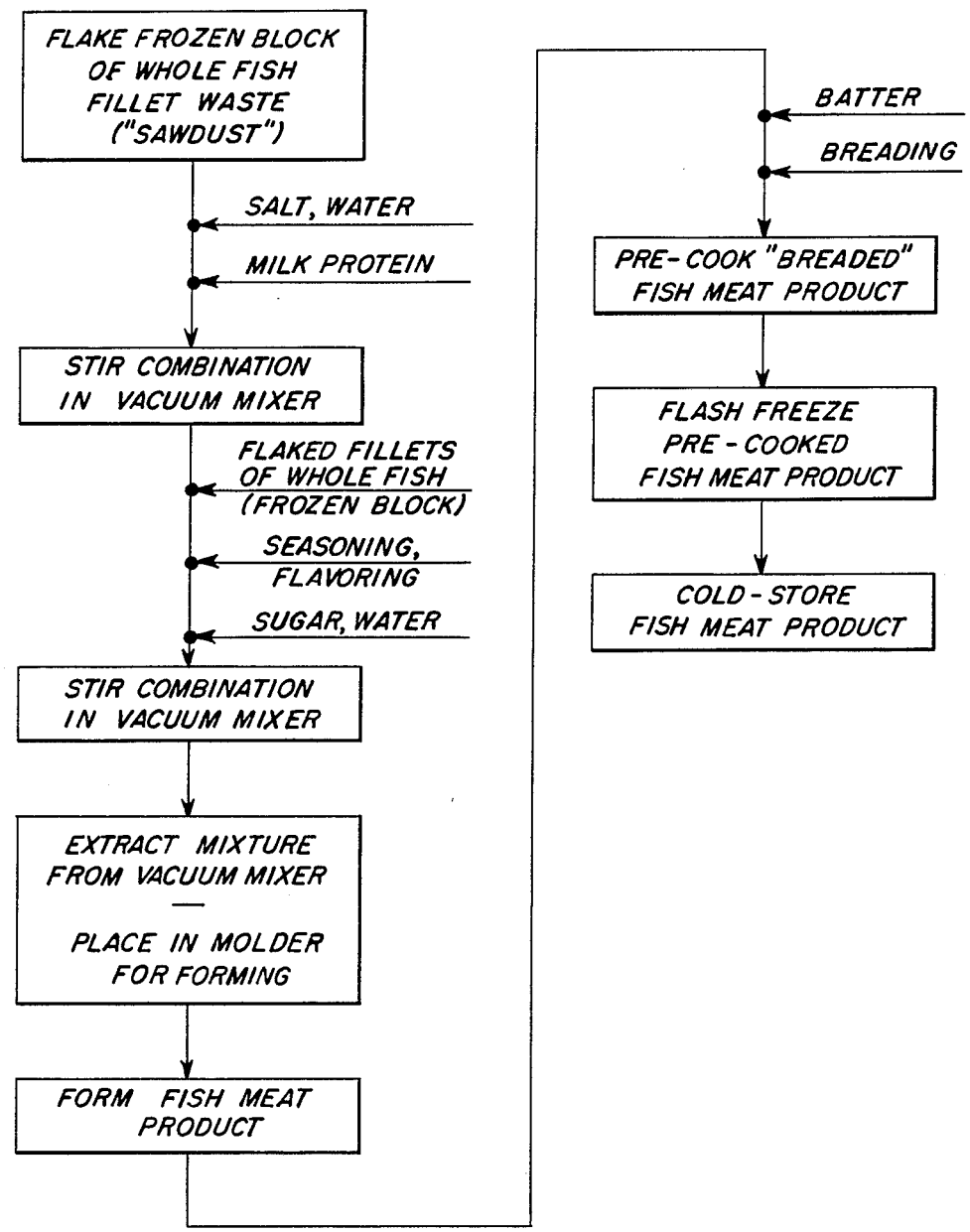
FIG. 1 is a block diagram of the sequencial steps of the manufacturing process of the present invention.

The following detailed description is of the best presently contemplated modes of carrying out the present invention. This description is not intended in a limiting sense, but is made solely for the purpose of illustrating the general principles of the invention.

The currently existing manufacturing process for seafood and fish patties and nuggets had a significant amount of fillers and binders contained in the product which were not consistent with the present trend toward pure, unadulterated, natural foodstuffs. The process of the present invention was first investigated in an endeavor to achieve a more nutritious and wholesome food. Thus, attempts to eliminate the binders, moisturizers, preservatives and other adulterating agents and the use of denaturing processes were made. However, these recent attempts were only partially successful.

A first attempt, made in late 1984, to reduce the amount of binder and preservative resulted in an end product which was not acceptable. The texture of the final fish meat product was not smooth as it contained non-uniform granules of fish meat. Also, a strong fishy flavor remained in the product.

This first experimental process attempted to utilize the naturally occurring protein complexes of the fish meat to assist in binding the fish meat together. This was necessary because the raw fish meat used as the base of the product was the waste from cutting, i.e. sawing, frozen blocked whole fish fillets. This waste came in the form of fish meat "sawdust" frozen into a large block. When thawed, each of the small particles of fish meat separated from the other. Thus, the necessity for binders to hold the raw product together.

The first experimental process began with the base frozen raw fish meat ("sawdust") comprising 96% (by weight) of a mixture additionally consisting of 1.5% sodium chloride [NaCl], a salt, 0.5% sodium tripolyphosphate [$Na_5P_3O_{10}$], a preservative for maintaining moisture content, and 2.0% water [$H_2O$]. The mixture was chopped or mixed in a large vat for approximately one-half hour at room temperature and pressure. At the end of the half hour period the mixture had become tacky or gummy. The naturally occurring proteins in the fish meat had released a gel in response to being combined with the salt.

The tacky fish meat mixture was then formed into "nuggets" and stiffened by freezing at 0° F. for approximately one hour. The stiffening was required because the gell released by the proteins did not have the same binding characteristics as the previously used potato flakes or milled wheat. The stiffened "nugget" was dipped into a batter and breading and immersed in heated oil for approximately 35 minutes. Excluding the last step, the fish meat was processed at an average temperature of 40°-45° F.

The problems encountered with the first experimental process were the lack of sufficient binding properties using entirely fish meat "sawdust", the lack of uniform texture of the mixture and the final product, and the strong fishy taste regardless of the kind of fish used. Although cod, haddock, pollock and flounder fish meat varieties are bland when compared to bluefish and ocean perch which are stronger and oily tasting, the strong fishy taste remained even when using the blander fish meat varieties. It was believed that a modified process would rectify the problems experienced with this process.

It should be noted that raw fish meat contains four main protein groupings: elastins, collagens, reticulins and myosins. The myosin group makes up the largest concentration of naturally occurring proteins in the raw fish meat (muscle). The myosin group is comprised of an intertwined fiberlike protein complex called actomyosin. This protein complex is composed of two proteins, actin and myosin. The two proteins can be separated or extracted from actomyosin complexes by means of salt solutions. Further, some polyphosphates have been shown to cause the actomyosin complex to become disassociated into its parts, actin and myosin. Although it appears that high salt concentrations would tend to cause the disassociation of the protein complex into its two parts, such is not the case. High salt concentrations cause the combining of actin and myosin to form actomyosin filaments creating a highly viscous condition capable of causing the binding together of separate flakes, shavings or granules of fish meat.

A second experimental process was attempted in mid-1986 to overcome the problems experienced in the earlier attempt. Again, the process was begun with flaked, shaved or granulated frozen blocked fish meat waste ("sawdust"). However, this time only 45% (by weight) of the mixture was comprised of the "sawdust". The raw fish meat "sawdust" was presalted and ground into granular sized particles. Sodium chloride [NaCl]. was again added to the fish meat "sawdust" in the amount of 1.5% by weight. Sodium tripolyphosphate [$Na_5P_3O_{10}$] was also added in the amount of 0.5% and the mixture was dry mixed by stirring in a vat for a period of approximately one-half hour. The mixing occurred at approximately 40° F. in an uncovered mixing vat. The resulting mixture became tacky or gummy upon the occurrence of the restructuring of the myosin protein complex. The mixture was then used as a binder for additional fish meat. It is important to note that denaturing of the fish meat by applying heat or subjecting the fish meat to a heating process will cause severe damage to the myosin protein complex which will render it incapable of producing the fibrous gell for binding the fish meat particles together.

Added to the tacky fish meat mixture ("sawdust") was an additional 45% (by weight) of flaked frozed fillets of whole fish along with seasonings and vegetable oil. To provide additional binding, first a flour mixture and then granulated potatoes were added. Reconstituted egg albumin and soy protein isolate powder have similar binding properties and were also tried. Each of these binding agents, either separately or in combination, made up 2.0% of the mixture by weight. Water was added as needed (up to 1.0%) and the entire mixture stirred in an open vat at approximately 40° F. for at least one-half hour. The resulting mixture was again stiffened by freezing for approximately one hour. The stiffened mixture was removed from the freezer, dipped in a batter and breading and pre-cooked in hot oil. The partially cooked fish meat product was then frozen and cold-stored. The end product was then re-heated and tested for product acceptability.

The end product again suffered from several deficiencies or problems. The texture was still not sufficiently smooth to be visually acceptable. A number of large non-uniform granules of fish meat were still visible. The binding properties of the end product were not acceptable as the intermediate mixture still required the addition of further binding agents. The experimental process did result in some successes as the added seasonings made the taste more palatable and the breading process provided an acceptable distribution over the entire surface of the end product. However, yet one further attempt was needed before the process met the requirements of consistency and taste, and could be repeatably used in a commercial manufacturing venture.

Referring generally to FIG. 1, the process of the present invention is described as follows. Frozen whole fish fillet waste or cuttings in the form of "sawdust", formed into a large block, is flaked, shaved, or ground into granular particles. The frozen block is delivered weighing approximately 55 lbs. Added to the flaked, shaved or granulated raw fish meat is 2 lbs. of high purity, refined granulated salt in the form of sodium chloride [NaCl]. Morton Salt's CULINOX® 999® SALT has been found to satisfy the required needs and is presently preferred. This particular salt exhibits 99.95% minimum purity. It has been established that the greater the salt purity (or the lack of impurities), the more intense the protein gell formation. Five pounds of water [H$_2$O] and one pound of milk protein isolate are also added. The milk protein is composed of casein and whey proteins isolated together from fresh skim milk. The milk protein is believed to enhance the release of the fish meat protein gell which increases the binding properties of the fish meat proteins.

The mixture is then stirred in a vacuum mixer for 15 to 20 minutes. The mixer is evacuated to 20 psi and the temperature of the mixture is lowered to 32° F. Thus, the mixing or stirring is occurring at a reduced temperature and pressure than what was previously used. It was also found that the mixing time was affected by the lowering of the temperature and pressure, reducing the time necessary to complete the mixing by at least a factor of three. These changes, in combination, bring about a quicker release of the protein gell. Another advantage is the reduction in the volume of air in contact with the foodstuffs. This will reduce the bacteria and the particulate matter contamination factor for the mixture. Such practice conforms entirely with the guidelines, recommendations and requirements of the Food and Drug Administration.

The application of heat to expand the gas (air) or decrease the reaction time is not acceptable. A denaturing of the fish meat proteins will occur when the fish meat is heated retarding or entirely preventing the reaction, the production of fibrous proteins. It was also found that the polyphosphate (sodium tripolyphosphate) is no longer required. The addition of water obviates the need for a moisture retention chemical. The reaction, or release of the protein gell, was not found to be inhibited without the presence of the polyphosphate.

The next step in the process is to add to the stirred fish meat (sawdust) mixture an additional 55 lbs. of frozen blocked fillets of whole fish which has been flaked, shaved or ground into granular particles. Seasoning is also added. The seasoning may include pepper (black or red), dill weed or parsley, and flavor enhancers. Granulated bleached sugar is also added for a more acceptable taste. The sugar directly acts against the salty, fishy taste of the end product. The seasoning and sugar are both added in one pound amounts. Five pounds of water is again added to the mixture to facilitate the mixing. The mixture is again stirred in the vacuum mixer at the same temperature and pressure until an even distribution is achieved. This has been found to take approximately 5 to 10 minutes. The resulting texture is a smooth, even distribution of the components of the mixture but with visibly detectable pieces of the fish meat fillets, in flake form, dispersed uniformly throughout. This result is visually acceptable as it enhances the perception of fish content without the addition of fillers and/or binders.

The mixture is removed or extracted from the vacuum mixer and transported to the forming machine. The mixture is placed in the feeder hopper of the forming machine and is fed to the mold or forming apparatus by either a gravity or hydraulic feed, as required. The mold or forming apparatus can make any number of compacted products, the size of the product being the determining factor. At the present time it is desired to form a double row of five units each of the "nugget" product. The product may also be formed into patties or any other desired form. Due to the enhanced binding properties exhibited by the mixture, there is no need to stiffen the mixture as was required previously.

The formed "nuggets" are conveyed to a batter application station where the formed "nuggets" are passed through a curtain of flowing chilled batter overflowing from an overhead reservoir. The batter is applied to the bottom of the "nugget" by passing the "nugget" through a catch reservoir located below the curtain to receive the excess chilled batter and recirculate it to the upper reservoir. The catch reservoir is located at or just below the height of the conveyor so that the "nuggets" are not fully immersed in the batter.

The breading is applied in the form of granulated bread crumbs in the same manner. The "nuggets" are passed beneath a shaker reservoir where the granulated bread crumbs are sprinkled on the top of the "nuggets". The "nuggets" are passed through a bin underneath the conveyor containing additional granulated bread crumbs which attach to the underside of the "nuggets". Excess or loose breading is removed in an air chamber by blowing compressed air over the surface of the "nuggets".

The breaded "nuggets" are then pre-cooked by immersion in vegetable oil having a temperature of 375° F. for approximately 35 seconds. The breaded "nuggets" are conveyed through a reservoir containing the hot vegetable oil. The length of the reservoir is determined by the length of cooking time and the speed of the conveyor system. After the immersion in the hot vegetable oil the pre-cooked "nuggets" are flash frozen to 0° F. by passing the "nuggets" through a flash freezing unit. The final temperature of the product along with the speed of the conveyor system governs the length of time in the freezing unit. This factor is determinative of the length of the freezing unit. The freezer unit contains liquid nitrogen [N$_2$] which creates an average temperature of approximately −150° F. in the freezing unit. The speed of the conveyor in the present system requires the freezer unit to be 34 feet long to accomplish the freezing and resulting temperature.

The flash frozen "nuggets" are then conveyed to a packaging station for packaging for cold storage and/or transportation. The "nuggets" may be packaged in 12 oz. trays for insertion into individual packages or in 10 to 20 lb. bulk boxes. These and other packaging procedures are well known in the industry and do not require further description herein. Of course, other kinds of packaging may be used depending upon the requirements of storage, transportation, displaying for sale and/or end use.

The patties or nuggets require storage at or below freezing. They may be reheated by either conventional and/or microwave heating to complete the cooking process. The texture and taste of the final cooked product has been found to be acceptable to consumers, i.e. food stores and ultimate purchasers.

The present invention may be embodied in other specific forms without departing from the spirit or essential attributes thereof and, accordingly, reference should be made to the appended claims, rather than to the foregoing specification, as indicating the scope of the invention.

I claim:

1. A process for manufacturing formed fish meat projects from the waste trimmings and cuttings of frozen whole fish fillets using only fish meat as a natural binding means, comprising the steps of:

(a) flaking, shaving, or grinding into granular particles of fish meat from a frozen block of whole fish fillet waste cuttings and/or trimmings in the form of fish meat sawdust;

(b) adding to the flaked, shaved, or ground fish meat sawdust means for initiating and enhancing the formation of fibrous protein gels to bind together the fish meat sawdust mixture;

(c) mixing or stirring the fish meat sawdust mixture with a predetermined amount of water to facilitate the mixing or stirring at a temperature in the range of 30–35° F. and pressure of approximately 20 psi until the protein gells form and the fish meat sawdust mixture becomes a tacky or pasty binding means;

(d) combining the tacky or pasty fish meat sawdust mixture with frozen fillets of whole fish which have been flaked, shaved, or ground into granular particles of fillet fish meat to bind together the fish meat sawdust and fillet fish meat combination;

(e) mixing or stirring the fish meat combination with a predetermined amount of water to facilitate the mixing or stirring at a temperature in the range or 30–35° F. and pressure of approximately 20 psi until the entire fish meat combination is uniformly mixed together;

(f) molding or forming the fish meat combination into a predetermined shape or shapes;

(g) applying a covering of batter and breading to the formed fish meat combination, pre-cooking the breaded formed fish meant combination and, flash freezing the pre-cooked breaded fish meat combination.

2. The process in accordance with claim 1 wherein equal proportions of fish meat sawdust and fillet fish meat are combined to achieve the desired binding characteristics for the entire fish meat combination.

3. The process in accordance with claim 1 wherein the means for initiating and enhancing the formation of fibrous protein gels is a highly pure sodium chloride compound and milk protein isolate.

4. The process in accordance with claim 1 comprising the further step of packaging the fish meat combination with materials useful for reheating predetermined portions or in bulk for cold storage and/or transport.

5. The process in accordance with claim 1 wherein the predetermined shape of the fish meat combination may be in the form of a patty or a nugget.

* * * * *